(12) United States Patent
Belanger (10) Patent No.: US 12,215,003 B2
(45) Date of Patent: Feb. 4, 2025

(54) LIFTING RIG FOR MOVING HEAVY OBJECTS ON ROOFTOPS

(71) Applicant: Marco Belanger, St-Amable (CA)

(72) Inventor: Marco Belanger, St-Amable (CA)

( * ) Notice: Subject to any disclaimer, the term of this patent is extended or adjusted under 35 U.S.C. 154(b) by 454 days.

(21) Appl. No.: 17/098,522

(22) Filed: Nov. 16, 2020

(65) Prior Publication Data

US 2021/0147195 A1    May 20, 2021

(30) Foreign Application Priority Data

Nov. 19, 2019 (GB) ........................... 1916858

(51) Int. Cl.
  *B66C 19/00* (2006.01)
  *B60G 17/00* (2006.01)
  *B66C 23/62* (2006.01)

(52) U.S. Cl.
  CPC ............ *B66C 19/005* (2013.01); *B60G 17/00* (2013.01); *B66C 23/62* (2013.01); *B60G 2500/30* (2013.01); *B60G 2600/20* (2013.01); *B66C 2700/0378* (2013.01)

(58) Field of Classification Search
  CPC ............... B60G 17/00; B60G 2500/30; B60G 2600/20; B66C 19/005; B66C 23/62; B66C 2700/0378
  USPC ................. 212/76, 77, 83, 87; 414/352, 460
  See application file for complete search history.

(56) References Cited

U.S. PATENT DOCUMENTS

| | | | |
|---|---|---|---|
| 2,909,298 A | | 10/1959 | Baudhuin |
| 3,059,782 A | | 10/1962 | Baudhuin |
| 3,110,404 A | | 11/1963 | DeStasi |
| 3,161,309 A | | 12/1964 | Baudhuin |
| 3,176,853 A | | 4/1965 | Baudhuin et al. |
| 3,236,392 A | | 2/1966 | Lamer et al. |
| 3,251,496 A | | 5/1966 | Lamer et al. |
| 3,329,284 A | | 7/1967 | Bogart, Jr. et al. |
| 3,335,875 A | * | 8/1967 | Fachinetti ............... B66C 19/02 212/343 |
| 3,831,791 A | * | 8/1974 | Gonzales ................ B66C 19/02 D34/34 |
| 3,973,754 A | * | 8/1976 | Chadwick, Jr. ....... B66C 19/005 254/323 |
| 4,279,347 A | | 7/1981 | Appleman |
| 4,381,839 A | | 5/1983 | Engler et al. |
| 4,740,131 A | * | 4/1988 | Mayle ....................... B62B 3/04 212/324 |
| 4,880,124 A | | 11/1989 | Feider et al. |
| 6,009,927 A | * | 1/2000 | Peters ................. A47G 27/0487 254/133 R |
| 6,345,724 B1 | | 2/2002 | Masumoto et al. |

(Continued)

*Primary Examiner* — James Keenan (57) ABSTRACT

A lifting rig for moving heavy objects on rooftops having a framework supported by a plurality of sets of wheel assemblies. The framework has a pair of longitudinal truss assemblies wherein each truss assembly sits on top of the sets of wheel assemblies. Each of the two truss assemblies has a mast member extending upwardly to a cross beam which thus connects both truss members. Each mast member extends telescopically from an anchor post which itself extends perpendicularly from a truss member forming part of the truss assembly. From the cross beam hangs at least one chain block for raising and lowering a load; the chain block is hooked onto a means for hooking straddling over the cross beam.

7 Claims, 6 Drawing Sheets

(56) References Cited

U.S. PATENT DOCUMENTS

| | | | |
|---|---|---|---|
| 7,621,077 B1* | 11/2009 | Perina | E02D 27/42 |
| | | | 52/119 |
| 9,708,163 B2* | 7/2017 | Ojapalo | B66C 19/02 |
| 10,577,227 B1* | 3/2020 | Napieralski | B60P 1/5461 |
| 2003/0180132 A1 | 9/2003 | Morreim | |
| 2005/0019142 A1* | 1/2005 | Miles | B60P 3/1091 |
| | | | 414/460 |
| 2014/0140795 A1* | 5/2014 | Pilgrim | B66C 19/005 |
| | | | 414/800 |
| 2015/0307329 A1 | 10/2015 | Rosenstrom et al. | |
| 2016/0200554 A1 | 7/2016 | Moran et al. | |
| 2016/0280516 A1* | 9/2016 | Rieger | B62B 3/02 |

\* cited by examiner

LIFTING RIG FOR MOVING HEAVY OBJECTS ON ROOFTOPS

BACKGROUND OF THE INVENTION

1. Field of the Invention

The present invention relates generally to lifting equipment but more particularly to a lifting rig for moving heavy objects on rooftops.

2. Description of Related Art

The installation of heavy equipment such as HVAC units on building rooftops is a complicated and time consuming operation since this is done towards the end of construction when there are many impediments such as pipes, vents and other hardware blocking a clear path to the intended destination of the the HVAC unit. A construction crane can put the HVAC unit to a general location on the rooftop, but the final position has to be done differently.

BRIEF SUMMARY OF THE INVENTION

It is a main object of the present disclosure to provide for a lifting rig for moving heavy objects on rooftops.

In order to do so, there is provided a lifting rig for moving heavy objects on rooftops having a framework supported by a plurality of sets of wheel assemblies. The framework has a pair of longitudinal truss assemblies wherein each truss assembly sits on top of the sets of wheel assemblies. Each of the two truss assemblies has a mast member extending upwardly to a cross beam which thus connects both truss members. Each mast member extends telescopically from an anchor post which itself extends perpendicularly from a truss member forming part of the truss assembly. From the cross beam hangs at least one chain block for raising and lowering a load; the chain block is hooked onto a means for hooking straddling over the cross beam.

The longitudinal truss member is exdendible by way of extension members.

The wheel assemblies are height adjustable by way of a crank.

The load is raised by the chain block equipped with cables and means for temporary attachment to the load.

The anchor post is further stabilized by way of struts forming part of the truss member The wheel assemblies can be removed from a wheel assembly socket and reconnected to another wheel assembly socket.

The wheel assemblies have a stub member into which is inserted a shaft so that the wheel can be manually pivoted, by an operator so as to point in a given direction for steering purposes.

The parts are configured to be disassemblable and reassemblable to facilitate transportation and set up on site.

The lifting rig is capable of being moved onto a higher surface by a method of use consisting in the steps of: ensuring that all the wheel assemblies have been extended upwardly so as to prepare for the rig to be moved to a higher surface. Removing one pair of the plurality of pairs of wheel assemblies from their respective wheel assemblies sockets while the remaining wheel assemblies support the rig which is moved towards the higher surface so that a first pair of wheel assemblies sockets is positioned over the higher surface. The first set of wheel assemblies has its height adjusted so as to be fitted according to the higher surface and fitted onto a new set of wheel assemblies sockets; a second set of wheel assemblies is removed from their respective wheel assemblies sockets and the sequence is repeated until the entire rig is relocated on the higher surface. All the wheel assemblies are raised when there is a need to move the rig to yet a higher surface.

BRIEF DESCRIPTION OF THE SEVERAL VIEWS OF THE DRAWINGS

Other features and advantages of the present invention will become apparent when the following detailed description is read in conjunction with the accompanying drawings, in which.

DETAILED DESCRIPTION OF THE PREFERRED EMBODIMENT

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein.

Figure 1:
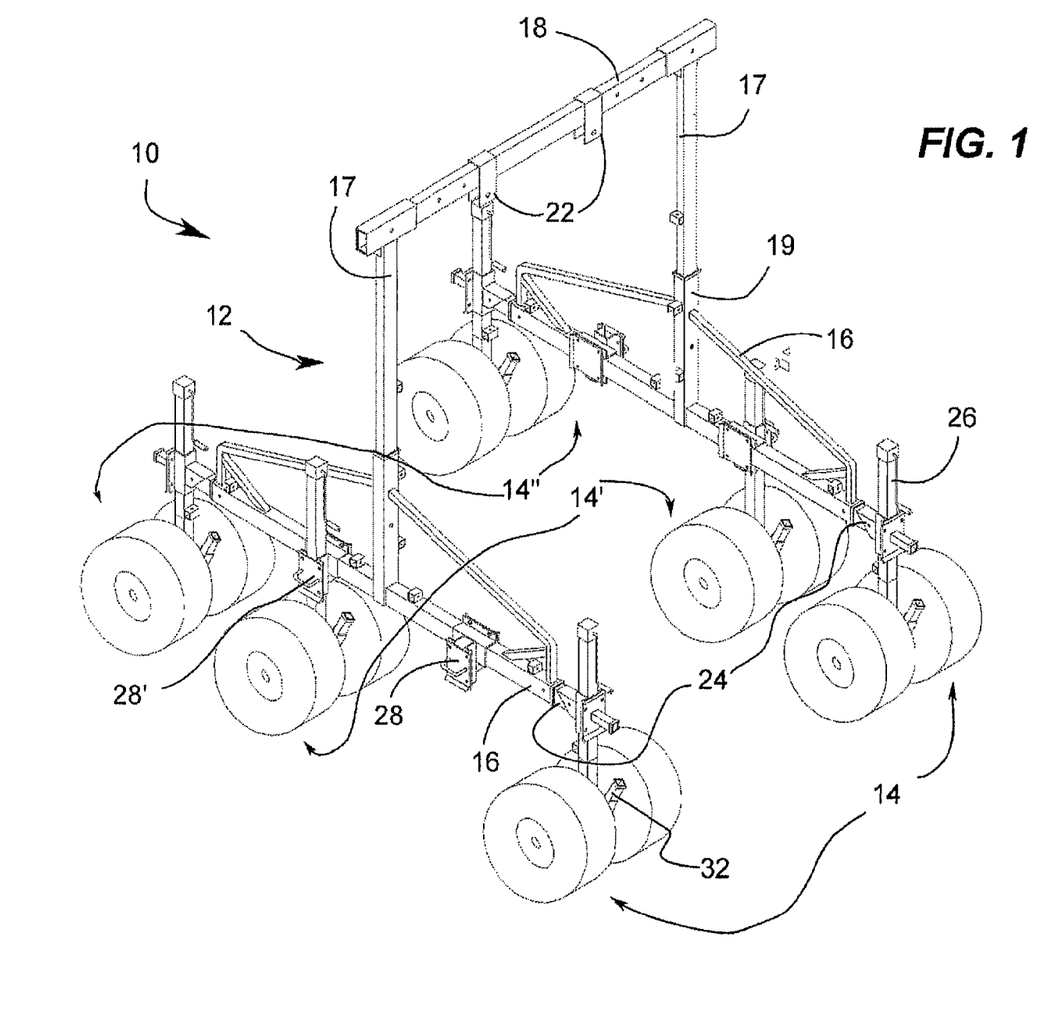
FIG. 1 is an isometric view, according to an embodiment of the present invention.
Figure 2:
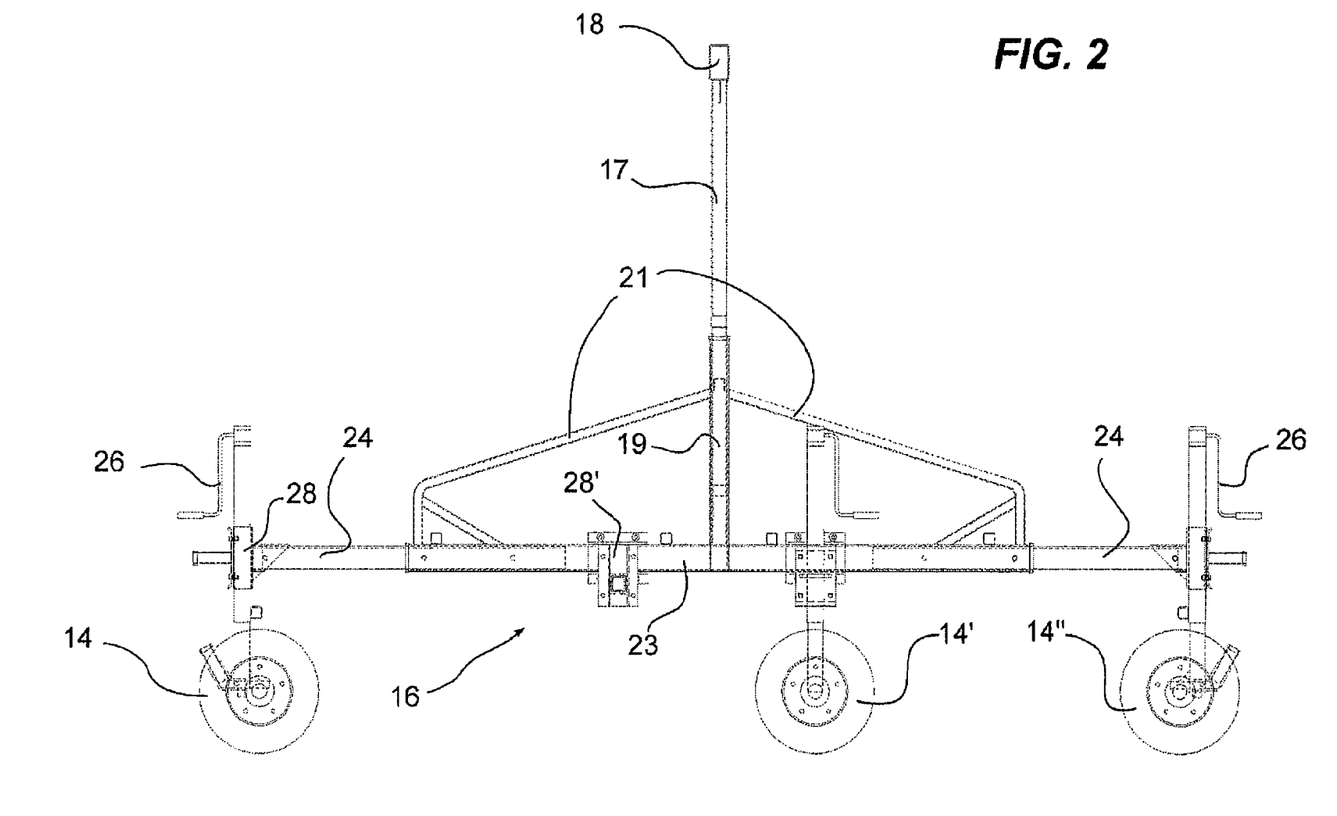
FIG. 2 is a side view, according to an embodiment of the present invention.

Referring now to seen in FIGS. 1 and 2, according to a first embodiment, there is provided a lifting rig (10) for moving heavy objects on rooftops comprised of a framework (12) supported on three sets of wheel assemblies (14, 14', 14") consisting of inflatable tires as known in the art. The framework (12) has a pair of longitudinal truss assemblies (16) wherein each truss assembly (16) sits on top of the sets of wheel assemblies (14, 14', 14"). Each of the two truss assemblies (16) has a mast member (17) extending upwardly to a cross beam (18) which thus connects both truss members (16). Each mast member (17) extends telescopically from an anchor post (19)—so as to be height adjustable—which itself extends perpendicularly from the truss assembly (16), more specifically a truss member (23). The anchor post (18) is further stabilized by way of struts (21) forming part of the truss member (23). From the cross beam (18) hangs at least one but preferably two or more chain blocks (20) for raising and lowering a load, such as an HVAC unit, for example. The chain blocks (20) are hooked onto a means for hooking (22) straddling over the cross beam (18).

As best seen in FIG. 2, the longitudinal truss member (16) is exdendible by way of extension members (24), and the wheel assemblies (14, 14', 14") can be height adjusted by way of a crank (26). Also, the wheel assemblies (14, 14', 14") can be quickly removed from a socket (28) and reconnected to another socket (28').

Figure 3A:
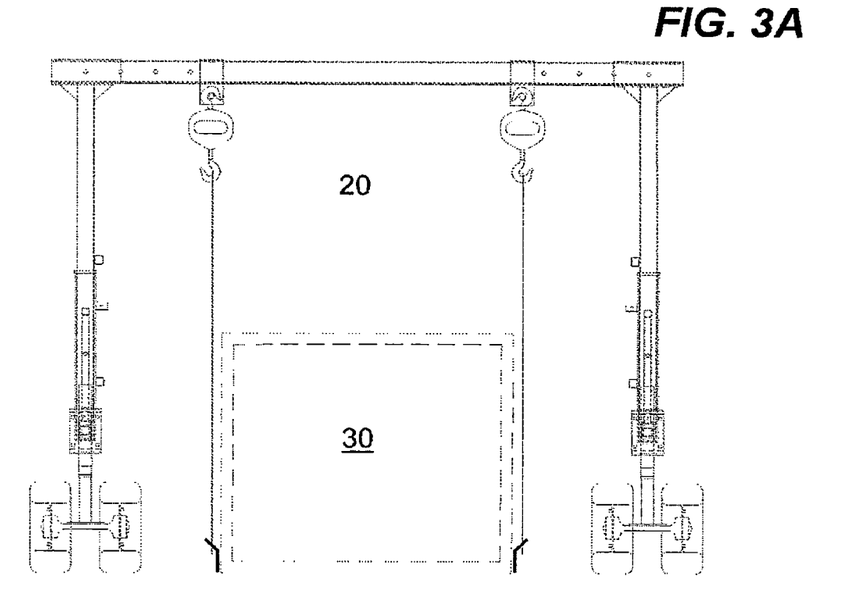
FIGS. 3A-B are front views showing a load in a low, then raised position, according to an embodiment of the present invention.
Figure 3B:
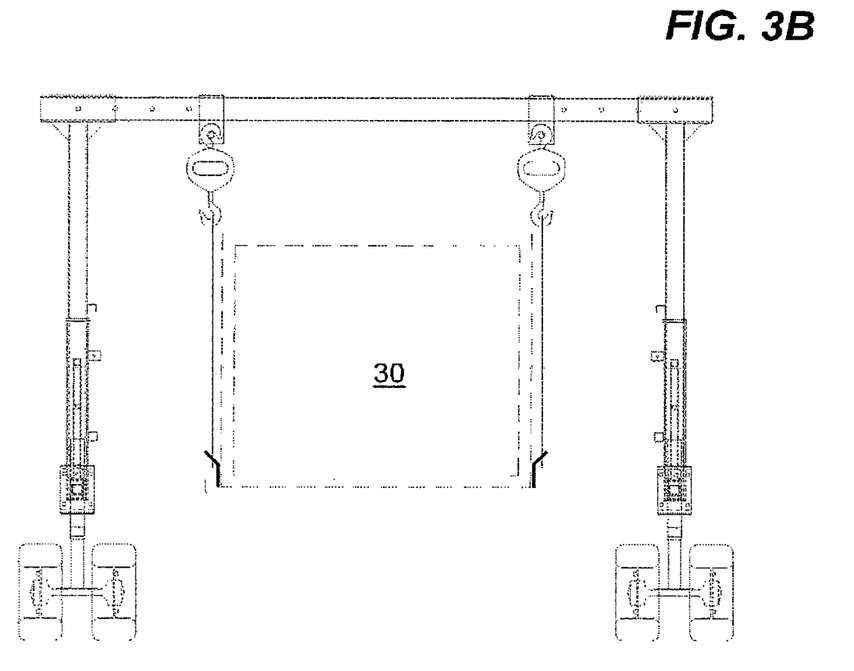

As best seen in FIGS. 3A-B, a load (30) can be raised by the chain blocks (20) equipped with cables and means for temporary attachment to the load (30).

Figure 4A:
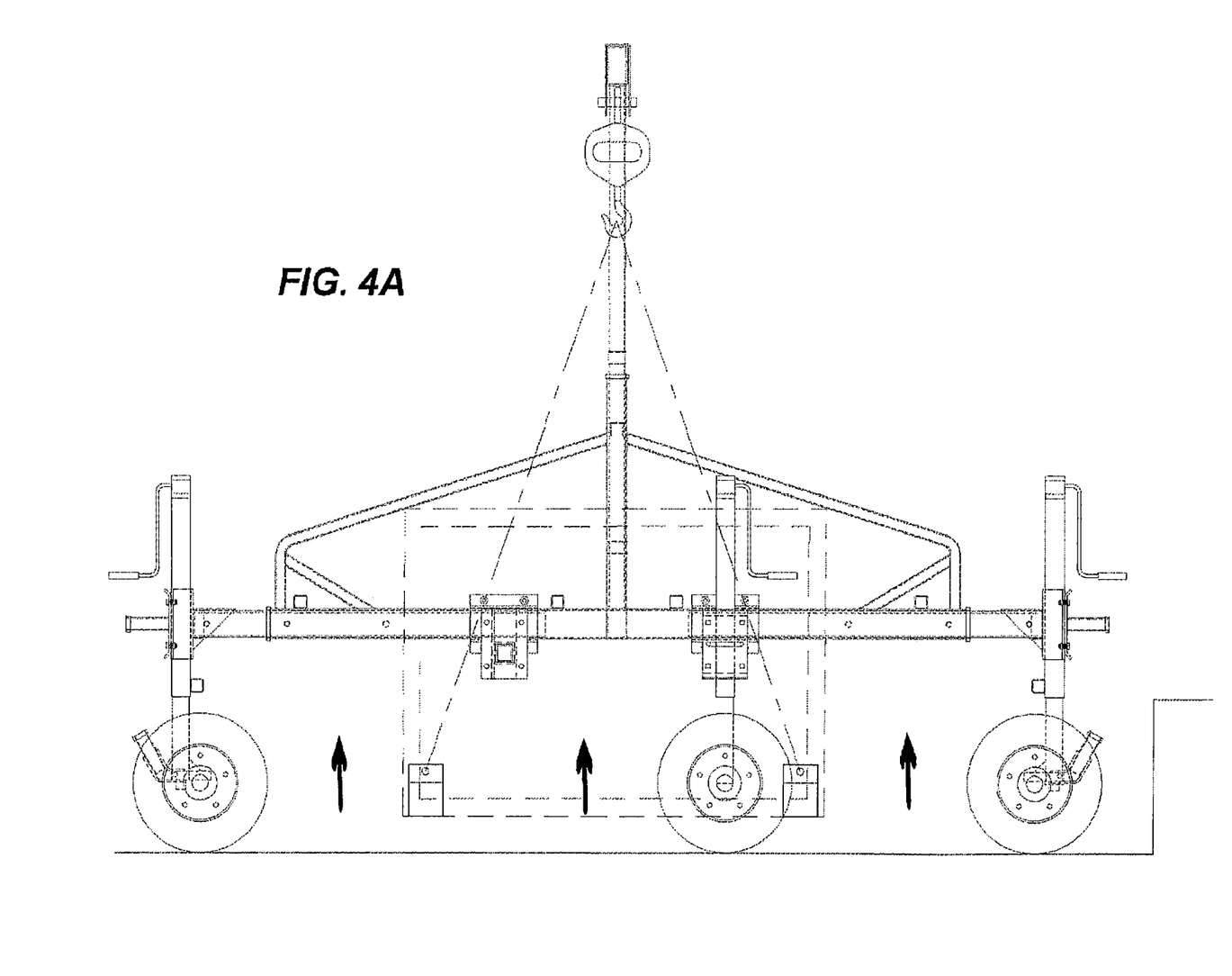
FIGS. 4A-C are side views showing the steps involved in moving moving from different surface levels, according to an embodiment of the present invention.
Figure 4B:
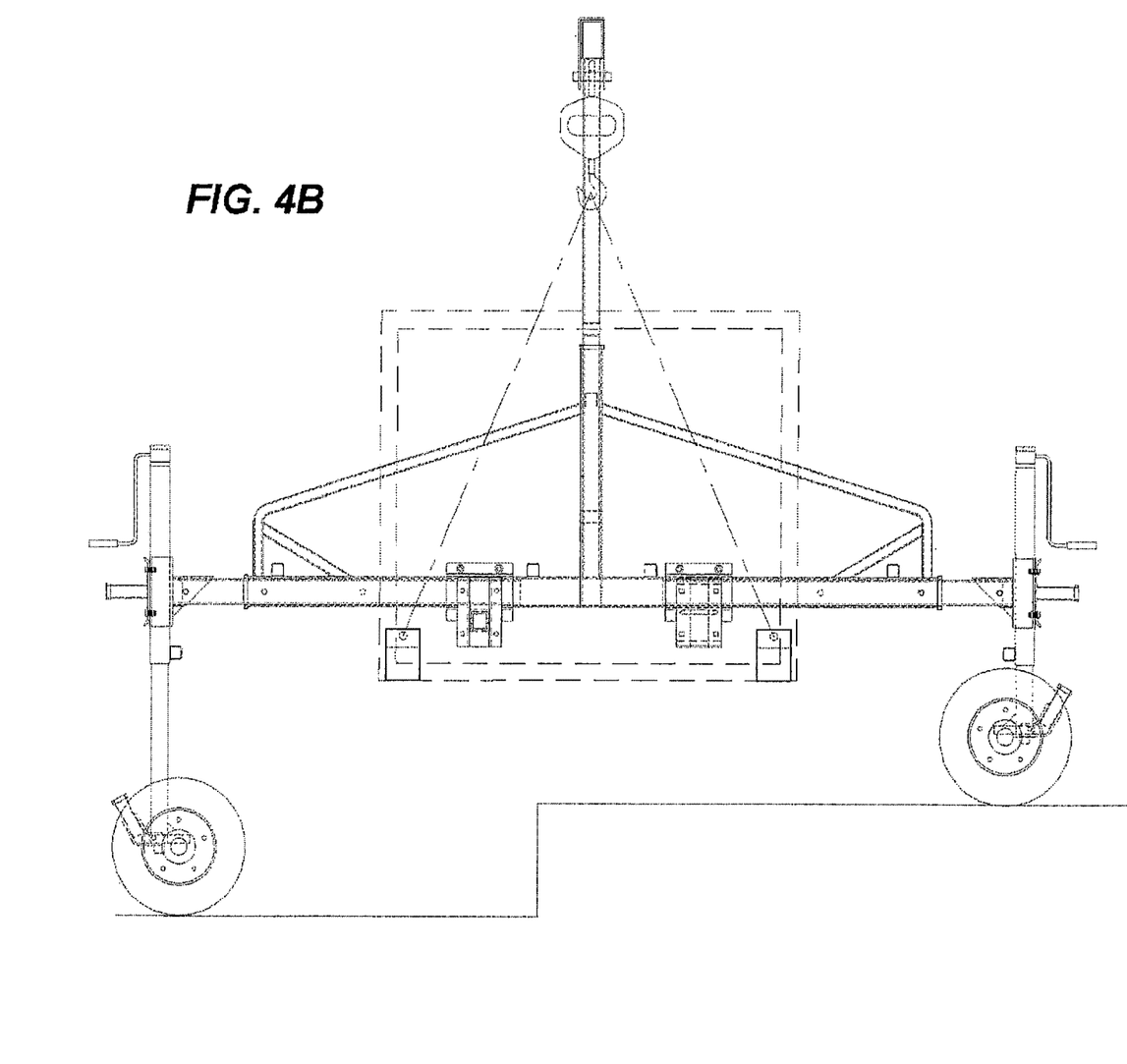
Figure 4C:
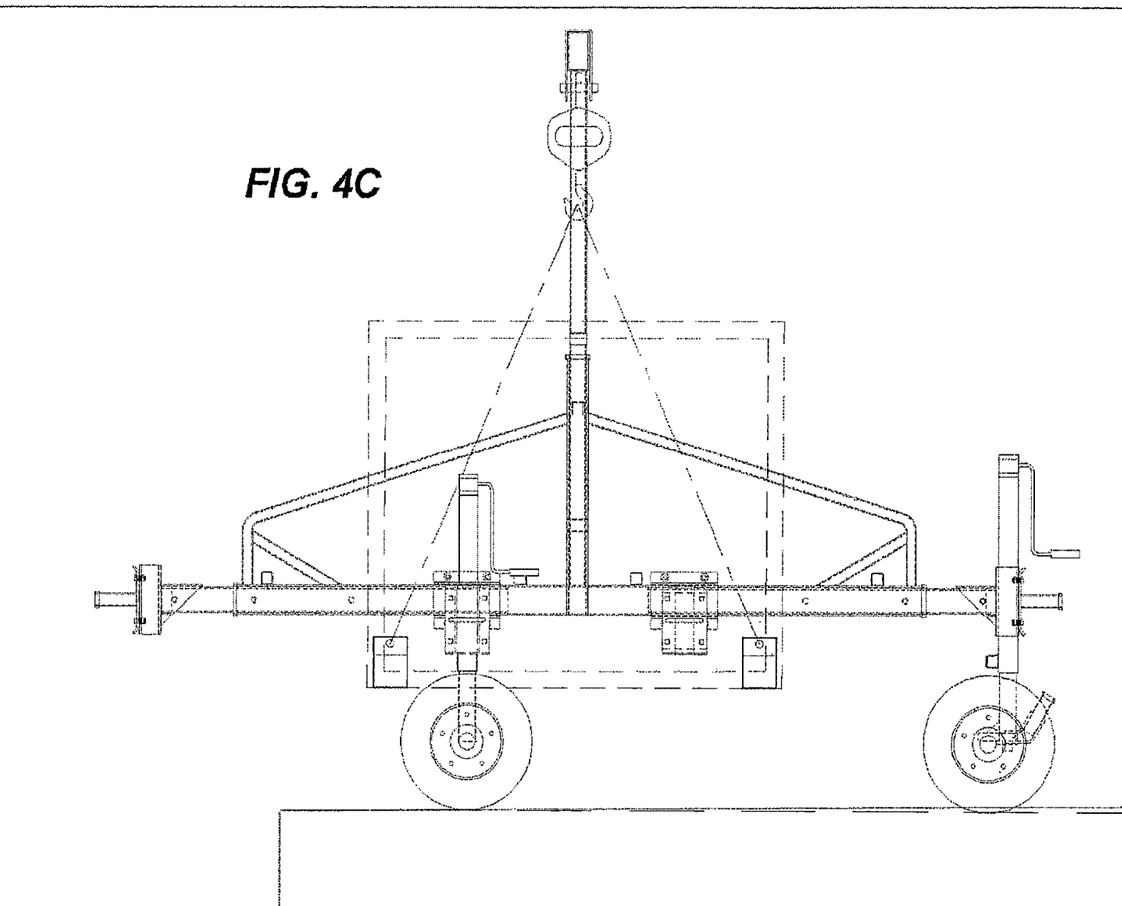

FIGS. 4A-C show how the lifting rig (10) can operate even when the rooftop has staggered levels, In this example, by making adjustments and changing the placement and the height of the wheel assemblies (14, 14', 14") the rig (10) can be moved over a higher surface by removing, in this example, the pair of wheel assemblies (14') located in the middle, and relying on the remaining wheel assemblies (14, 14") for support until the first wheel assembly (14), with a reduced extension to match with the higher surface, as seen in FIG. 4B, is fitted on the higher surface. Then, as per FIG. 4C, the rig (10) is moved further and the middle set of wheel assemblies (14') is reinstalled and then the third wheel assembly (14") can be removed or height adjusted to the new higher surface. The wheel assemblies (14, 14', 14") are releasably attached to wheel assemblies sockets (28) and some or all wheel assemblies have a stub member (32) into which is inserted a shaft (34) so that the wheel can be manually pivoted, by an operator, so as to point in a given direction for steering purposes.

The rig (10) can easily be partially disassembled for easy transportation and set up on site.

Although the invention has been described in considerable detail in language specific to structural features, it is to be understood that the invention defined in the appended claims is not necessarily limited to the specific features described. Rather, the specific features are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) are not used to show a serial or numerical limitation but instead are used to distinguish or identify the various members of the group.

The invention claimed is:

1. A lifting rig for moving heavy objects on a roof comprising:
a framework supported by six wheel assemblies; the framework has two longitudinal truss assemblies; each of the two truss assemblies has a mast member extending upwardly to a cross beam, the cross beam having a first end and a second end, each of the ends of the cross beam being connected to respective distal ends of the mast members; each of the respective mast members from each of the two truss assemblies extends telescopically from a respective anchor post; each of the anchor posts extends perpendicularly from a respective one of the truss members forming part of a respective one of the truss assemblies; from the cross beam hangs at least one chain block for raising and lowering a load; the at least one chain block is hooked onto a means for hooking which straddles over the cross beam; each of the wheel assemblies being height adjustable by way of a respective crank;
each of the wheel assemblies being received in a respective socket attached to the respective truss assembly, each of the truss assemblies having an additional socket not containing a respective one of the wheel assemblies; whereby a respective one of the wheel assemblies is removable from the respective socket containing said respective wheel assembly and inserted in the respective additional socket that did not contain a respective one of the wheel assemblies.

2. The lifting rig of claim 1 wherein each of the longitudinal truss member is extendible by way of extension members.

3. The lifting rig of claim 1 wherein the load is raised by the at least one chain block equipped with cables and means for temporary attachment to the load.

4. The lifting rig of claim 1 wherein each of the anchor posts is further stabilized by way of struts forming part of each of the truss assemblies.

5. The lifting rig of claim 1 wherein each of the wheel assemblies has a stub member into which is inserted a shaft so that respective wheels of the respective wheel assemblies can be manually pivoted, so as to point in a given direction for steering purposes.

6. The lifting rig of claim 1 wherein the lifting rig is configured to be disassembled and reassembled to facilitate transportation and set up on site.

7. A method of moving an object on a roof using a lifting rig, comprising:
a) providing the lifting rig, the lifting rig comprising:
a framework supported by six wheel assemblies; the framework has two longitudinal truss assemblies; each of the two truss assemblies has a mast member extending upwardly to a cross beam, the cross beam having a first end and a second end, each of the ends of the cross beam being connected to respective distal ends of the mast members; each of the respective mast members from each of the two truss assemblies extends telescopically from a respective anchor post; each of the anchor posts extends perpendicularly from a respective one of the truss members forming part of a respective one of the truss assemblies; from the cross beam hangs at least one chain block for raising and lowering a load; the at least one chain block is hooked onto a means for hooking which straddles over the cross beam; each of the wheel assemblies being height adjustable by way of a respective crank;
each of the wheel assemblies being received in a respective socket attached to the respective truss assembly, each of the truss assemblies having an additional socket not containing a respective one of the wheel assemblies;
whereby a respective one of the wheel assemblies are removable from the respective socket containing said respective wheel assembly and inserted in the respective additional socket that did not contain a respective one of the wheel assemblies;
b) ensuring that all the wheel assemblies have been extended so as to prepare for the lifting rig to be moved from a lower surface to a higher surface;
c) removing one pair of the wheel assemblies from their respective wheel assemblies sockets while the remaining wheel assemblies support the rig which is moved towards the higher surface so that a first pair of the wheel assemblies sockets is positioned over the higher surface;
d) adjusting the first set of wheel assemblies sockets to accommodate the higher surface and fitting a different set of said wheel assemblies into respective said sockets;
e) removing a second set of said wheel assemblies their respective wheel assemblies sockets;
f) repeating steps b)-e) with the respective remaining pairs of wheel assemblies until the entire rig is relocated on the higher surface.

\* \* \* \* \*